(12) United States Patent
Chapman

(10) Patent No.: US 11,378,725 B2
(45) Date of Patent: Jul. 5, 2022

(54) APPARATUS AND METHOD FOR FORMING A LAYERED DIFFRACTION GRATING AND A PRINTED ARTICLE INCLUDING A LAYERED DIFFRACTION GRATING

(71) Applicant: Xerox Corporation, Norwalk, CT (US)

(72) Inventor: Edward N. Chapman, Rochester, NY (US)

(73) Assignee: XEROX CORPORATION, Norwalk, CT (US)

(*) Notice: Subject to any disclaimer, the term of this patent is extended or adjusted under 35 U.S.C. 154(b) by 410 days.

(21) Appl. No.: 16/352,047

(22) Filed: Mar. 13, 2019

(65) Prior Publication Data
US 2020/0292736 A1    Sep. 17, 2020

(51) Int. Cl.
| | |
|---|---|
| *G02B 5/18* | (2006.01) |
| *G02B 26/08* | (2006.01) |
| *G02B 27/42* | (2006.01) |
| *G03G 13/00* | (2006.01) |
| *B29D 11/00* | (2006.01) |
| *G03G 15/00* | (2006.01) |
| *B05D 5/06* | (2006.01) |

(52) U.S. Cl.
CPC .......... *G02B 5/1828* (2013.01); *B05D 5/063* (2013.01); *B29D 11/00769* (2013.01); *G02B 5/1814* (2013.01); *G02B 5/1847* (2013.01); *G02B 5/1857* (2013.01); *G02B 26/0808* (2013.01); *G02B 27/4244* (2013.01); *G03G 13/00* (2013.01); *G03G 15/6588* (2013.01)

(58) Field of Classification Search
CPC .. G02B 5/1828; G02B 5/1847; G02B 5/1857; G02B 5/1861; G02B 5/1814; G02B 5/1819; G02B 5/1866; G02B 5/188; B29D 11/00769
USPC ............... 359/2, 576, 567; 283/85; 382/173; 428/403
See application file for complete search history.

(56) References Cited

U.S. PATENT DOCUMENTS

| | | | |
|---|---|---|---|
| 5,428,479 A * | 6/1995 | Lee | G02B 5/1842 359/558 |
| 8,824,032 B2 * | 9/2014 | Schnieper | G02B 27/42 359/2 |
| 2001/0022848 A1 * | 9/2001 | Rhoads | G11B 20/00855 382/100 |
| 2003/0190473 A1 * | 10/2003 | Argoitia | G02B 5/1861 428/403 |

(Continued)

OTHER PUBLICATIONS

U.S. Appl. No. 16/129,104, filed Sep. 12, 2018, Chapman.

(Continued)

*Primary Examiner* — Audrey Y Chang
(74) *Attorney, Agent, or Firm* — Fay Sharpe, LLP

(57) ABSTRACT

A method of forming an article which includes a diffraction grating, an article, and an apparatus for forming the article by printing are described. The method includes forming a periodic structure by printing a first set of parallel lines on a first side of a transparent substrate with a marking material and printing a second set of parallel lines on a second side of the transparent substrate with a marking material, the first and second sets of lines, in combination, defining a grating having a frequency and a spacing between lines which causes incident light to be diffracted into a plurality of beams travelling in different directions.

22 Claims, 11 Drawing Sheets

(56) References Cited

U.S. PATENT DOCUMENTS

| | | |
|---|---|---|
| 2010/0046033 A1 | 2/2010 | Kulkarni et al. |
| 2011/0129150 A1* | 6/2011 | Kimura ................. G06T 1/00 382/173 |
| 2015/0061280 A1* | 3/2015 | Power ................. B42D 25/351 283/85 |
| 2017/0336716 A1 | 11/2017 | Flagello et al. |
| 2018/0134062 A1 | 5/2018 | Hansen et al. |
| 2020/0070506 A1* | 3/2020 | Nitta ................. B41J 2/04573 |

OTHER PUBLICATIONS

E. Popov, "Introduction to Diffraction Gratings: Summary of Applications," in "Gratings: Theory and Numerical Applications," pp. 1-27, E. Popov, Editor (2012), available at http://www.fresnel.fr/files/gratings/Chapter1.pdf.

\* cited by examiner

APPARATUS AND METHOD FOR FORMING A LAYERED DIFFRACTION GRATING AND A PRINTED ARTICLE INCLUDING A LAYERED DIFFRACTION GRATING

BACKGROUND

Aspects of the exemplary embodiment relate to diffraction gratings and find particular application in connection with an apparatus and method for forming a diffraction grating using xerographic printing.

Diffraction gratings are used to diffract light or other incident radiation into several beams and find application in monochromators and spectrometers. Diffraction gratings have a periodic structure, typically formed by parallel ridges or rulings, and can be transmissive or reflective. The directions of the beams depend on the spacing of the grating and the wavelength of the light. See, for example, E. Popov, "Introduction to Diffraction Gratings: Summary of Applications," in "Gratings: Theory and Numerical Applications," E. Popov, Editor (2012), http://www.fresnel.fr/files/gratings/Chapter1.pdf.

Conventionally, diffraction gratings are often formed on sheets of glass and thus are fairly brittle and costly to produce. It would be desirable to have a transmissive or reflective diffraction grating which is easily produced and is flexible. Such a diffraction grating, in additional to conventional uses, could be incorporated into a book or a document.

INCORPORATION BY REFERENCE

The following references, the disclosures of which are incorporated herein by reference in their entireties, are mentioned:

U.S. Pub. No. 20100046033, published Feb. 25, 2010, entitled METHOD TO IMPROVE IMAGE ON PAPER REGISTRATION MEASUREMENTS, by Kulkarni, et al., describes a method of controlling the placement of images on the output of a printer, including determining a scanner spatial error using an ideal medium having a first two-dimensional array on the ideal medium then determining printer spatial error using a second medium having a second two-dimensional array, and controlling placement of images on the output of the printer based on the scanner spatial error and the printer spatial error.

U.S. Pub. No. 20170336716, published Nov. 23, 2017, entitled EUV LITHOGRAPHY SYSTEM FOR DENSE LINE PATTERNING, by Flagello, et al., describes an extreme ultra-violet (EUV) lithography ruling engine configured to print one-dimensional lines on a target workpiece. The device includes a source of EUV radiation, a pattern-source defining a 1D pattern, an illumination unit to irradiate the pattern-source, and projection optics which optically image, with a reduction factor N>1, the 1D pattern on an image surface that is optically-conjugate to the 1D pattern.

U.S. Pub. No. 20180134062, published May 17, 2018, entitled METHOD FOR PRODUCING A DOCUMENT AND A DOCUMENT, by Hansen, et al., describes a method for producing a security document. A security feature of the document includes a diffraction relief structure which is molded into the surface of a varnish layer. The diffraction relief structure is formed by regular gratings in which the spacing of the individual structural elements with respect to each other is smaller than a wavelength A in the visible light range.

U.S. application Ser. No. 16/129,104, filed Sep. 12, 2018, entitled APPARATUS AND METHOD FOR FORMING A DIFFRACTION GRATING AND PRINTED ARTICLE INCLUDING A DIFFRACTION GRATING, by Chapman, describes forming a grating by printing lines on a transparent sheet. an electronic image of the diffraction grating. The amount of white light that passes can be controlled by the widening the toner mounds which define the lines. One limitation of this is that when trying to limit the amount of light, dot gain may fill in toner between mounds ending the diffraction grating effect.

BRIEF DESCRIPTION

In accordance with one aspect of the exemplary embodiment, a method of forming an article including a diffraction grating includes forming a periodic structure by printing a first set of parallel lines on a first side of a transparent substrate with a marking material and printing a second set of parallel lines on a second side of the transparent substrate with a marking material, the first and second sets of lines, in combination, defining a grating having a frequency and a spacing between lines which causes incident light to be diffracted into a plurality of beams travelling in different directions.

In accordance with another aspect of the exemplary embodiment, an article includes a transparent substrate and a diffraction grating forming a periodic structure. The diffraction grating includes a first set of parallel lines of marking material on a first side of the transparent substrate and a second set of parallel lines of marking material on a second side of the transparent substrate. The diffraction grating has a frequency and a spacing between lines which causes incident light to be diffracted into a plurality of beams travelling in different directions.

In accordance with another aspect of the exemplary embodiment, a printing apparatus for forming an article including a diffraction grating includes memory which stores a first vector pattern cell, instructions for combining multiple instances of the first vector pattern cell to form a first array of parallel lines and instructions for applying a transform to the first array of parallel lines to generate a second array of parallel lines, or for applying a transform to the first vector pattern cell to generate a second vector pattern cell and for combining multiple instances of the second vector pattern cell to form a second array of parallel lines. The apparatus further includes a source of a transparent substrate, a first marking engine which prints the first array of parallel lines onto a first side of the transparent substrate, the first marking engine or a second marking engine printing the second array of parallel lines onto a second side of the transparent substrate, and, optionally, an assembly component, which assembles a stack comprising a sheet of glossy paper or card, the printed transparent substrate, and optionally at least one transparent layer and optionally joins the stack together, to form the article.

DETAILED DESCRIPTION

Aspects of the exemplary embodiment relate to an article including a diffraction grating which is generated using a vector pattern cell of parallel lines and to an apparatus and method for forming the article.

The system and method enable a low-cost 3D diffraction grating to be printed on a 2D printer using standard transparent medias and marking material(s), such as ink(s) or toner(s).

The method includes forming a periodic structure by printing lines on first and second sides of a transparent substrate with a marking material. The lines, in combination, have a frequency/pitch and a spacing which causes incident visible light to be diffracted into a plurality of (generally several) beams travelling in different directions.

A first vector pattern cell of parallel lines is created with variable angle, frequency and width. A first diffraction grating of size X by Y is created by filling an area of size X by Y with the first vector pattern cell and printing that on a first side of standard transparency media. The first vector pattern cell is transformed to account for front to back registration and desired alignment and an area of size X by Y is printed on the back side of the first diffraction grating. The transformation may include rotation of the first vector pattern cell through 90°, translating the pattern by half the line gap to be centered, and scaling of one of the first and the second vector pattern cells, as needed, to account for registration errors.

An advantage of the system and method is that a high frequency of lines is achieved by forming adjacent lines on opposite sides of the substrate, enabling a doubling of the frequency at the same resolution. Another advantage is the ability to provide an improved white light limiter.

Figure 1:
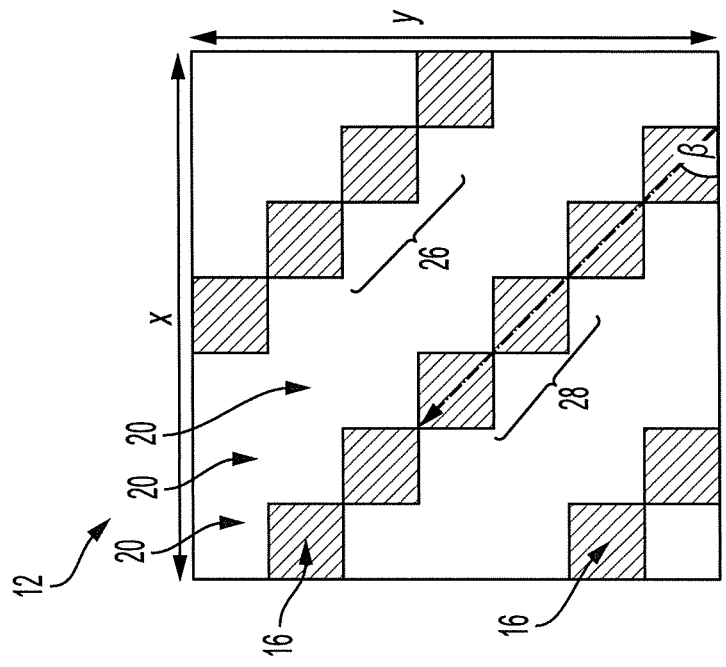
FIG. 1 illustrates a first vector pattern cell in accordance with one aspect of the exemplary embodiment.
Figure 2:
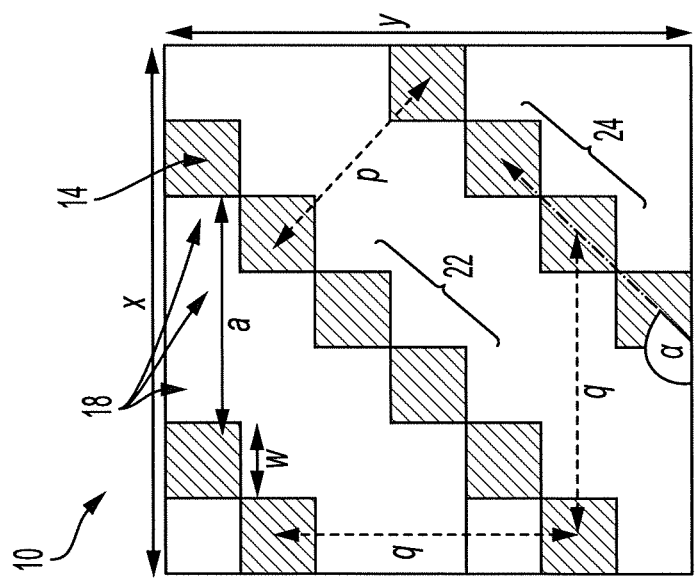
FIG. 2 illustrates a second vector pattern cell in accordance with one aspect of the exemplary embodiment.

FIGS. 1 and 2 illustrate example first and second vector pattern cells 10, 12, having horizontal and vertical dimensions (x, y). Dimensions x and y may be, for example, from 5 to 20 pixels. In one embodiment, x=y. Each of the vector pattern cells 10, 12 includes "on" pixels (such as pixels 14, 16) spaced by "off" pixels (such as pixels 18, 20). The "on" pixels are arranged in parallel lines. For example, the vector pattern cell 10 of FIG. 1 includes parallel line segments 22, 24, which are spaced at an interval q in the x and/or y direction(s). Similarly, in vector pattern cell 12, the "on" pixels form parallel line segments 26, 28. The shortest distance (pitch) between midpoints of two adjacent parallel lines is denoted $$p(p = \frac{\sqrt{q^2}}{2}$$

in the illustrated embodiment).

When one or multiple instances of vector pattern cell 10 are printed on a first (recto) side 30 of a transparent substrate 32 (FIG. 3), the line segments 22, 24 are connected to form a first array 46 (FIG. 4) of parallel lines 34, 36. When one or multiple instances of vector pattern cell 12 are printed on a second (verso) side 38 of the substrate 32, the line segments 26, 28 are connected to form a second array 48 of parallel lines 40, 42, etc. Parallel lines 40, 42 are interspaced with parallel lines 34, 36. As a result, the parallel lines 34, 40, 36, 42 have an (average) pitch, denoted p', of p/2.

In one embodiment, rather than providing a vector pattern cell 12, a correction matrix or affine transform is applied to the first array 46 of parallel lines generated from vector pattern cell 10 to generate the second array 48.

Each line 34, 40, 36, 42 is constructed from a contiguous sequence of "on" pixels 14, 16, 18, 20, etc. Each line can have a width w of as little as one pixel (in the X and/or Y direction) although wider lines are contemplated. A pixel represents the smallest dot which can be printed. Pixels are represented by square blocks in FIGS. 1 and 2, although it is to be appreciated that they may have other shapes when rendered by printing. An "on" pixel (shown in black) is one which is intended to be rendered with a marking material, such as dry toner particles. In each vector pattern cell 10, 12, the spacing a between adjacent lines in the x and/or y direction can be as little as 1 pixel, although larger spacings are contemplated, such as at least two, or at least three, or at least four "off" pixels 18 between each adjacent pair of on pixels to allow for dot gain (printed pixels being wider than the theoretical width w). On vector pattern cell 10, each line segment 22, 24 is equally angled at angle α to the horizontal, such as at 45° to the horizontal. For example, in FIG. 1, the line segments 22, 24 are one pixel wide and spaced by three "off" pixels 18 in the x and y directions (z=4), or put another way, the "on" pixels have a frequency of ¼ in the x and y directions. The frequency P of vector pattern cell 10 in the direction perpendicular to the lines $$= \frac{1}{p} = \frac{1}{\sqrt{8}} \cong 0.35.$$

In vector pattern cell 12, the frequency P is the same as for vector pattern cell 10. However, the angle β of each line segment 26, 28 to the horizontal is selected such that the resulting printed lines 34, 40, 36, 42, all have the same angle to the horizontal when viewed from the same side of the article 32. In the illustrated example, β=180−α=135°. As will be appreciated, the vector pattern cells 10, 12, for forming parallel lines 34, 40, 36, 42 can be generated with another specified angle, frequency and width, which is variable. In the case where α=90°, β=90°.

Figure 3:
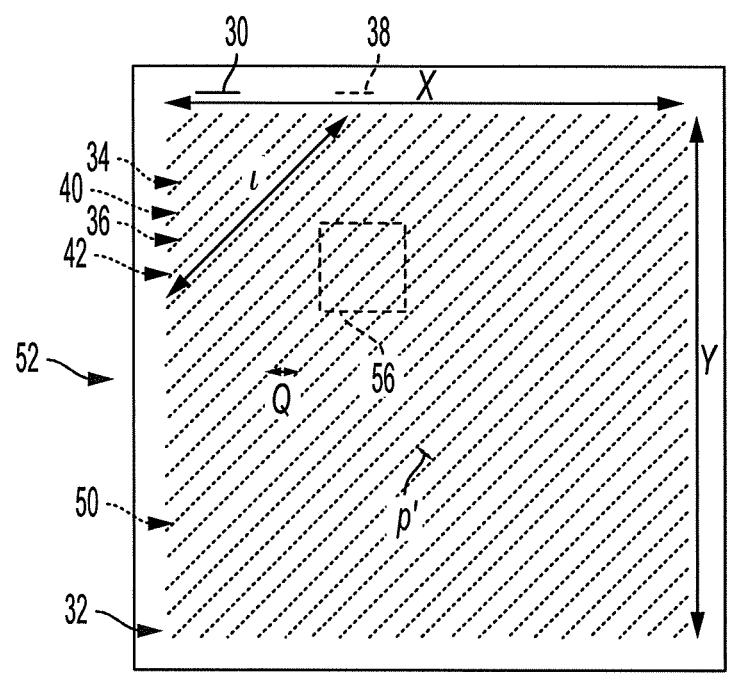
FIG. 3 illustrates an article including a diffraction grating composed of vector pattern cells according to FIGS. 1 and 2.

In combination, the first array 46 and second array 48 form an array 50 of size X by Y with approximately double the number of lines as arrays 46, 48, that can serve as a diffraction grating (FIG. 3). The diffraction grating 50 of size X by Y can be created by filling an area of size X×Y with multiple instances of the vector pattern cell 10 or 12 and printing each array of cells on a respective side 30, 38 of the substrate 32 to form a printed article 52. For example, X is at least 4x or at least 10x, and/or Y is at least 4y or at least 10 y.

Figure 4:
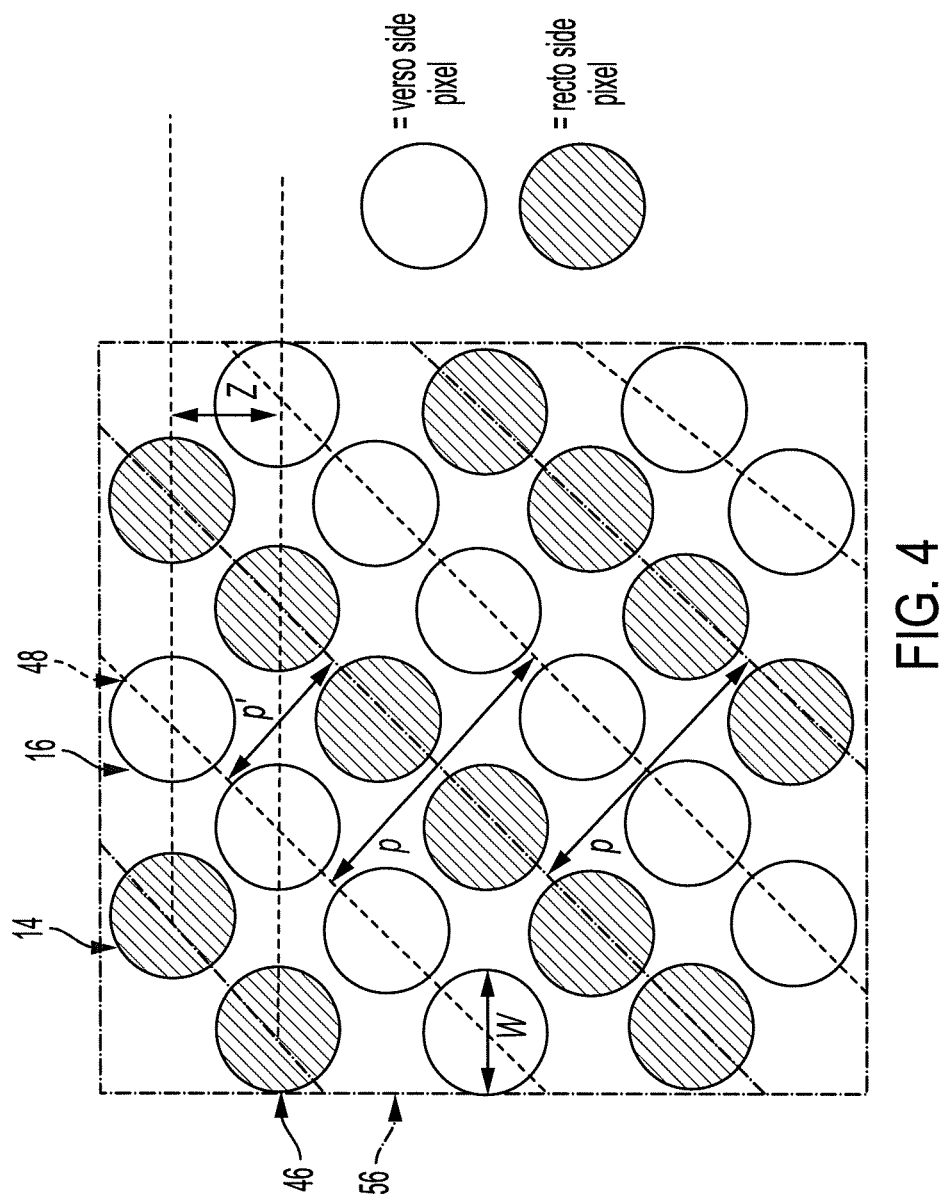
FIG. 4 is an enlarged view of a portion of the diffraction grating of FIG. 3.

FIG. 4 shows an enlarged portion of the grating 50 of FIG. 3. The frequency P' of the grating 50 in a direction perpendicular to the lines $$= \frac{1}{p'},$$

where p' is the pitch (p'=p/2).

In the printed article 52, the lines 34, 40, 36, 42 may each have a width W (in the X and/or Y direction) of no more than 0.01 cm or no more than 0.005 cm, for example. A distance Q (here, Q=q/2), between the midpoints of adjacent lines 34, 40, in the X and/or Y direction, may be no more than 0.05 cm, or no more than 0.03 cm. In one embodiment, q>2W and Q>W. The ratio of $$Q: W \left( \cong \frac{z}{2} : w \right)$$

may be at least 1 or at least 1.2 or at least 1.5. The width W of the lines depends on the dots per inch (dpi) of the printer. 600 dpi printers can print up to 300 lines per inch, in X and Y directions, with an interval z of two pixels (~118 lines per cm, which is equivalent to ~236 lines per cm, when printed on both sides of a sheet), or 75 lines per inch with an interval z of 7 pixels (~30 lines per cm, which is equivalent to ~60 lines per cm, when printed on both sides of a sheet). The frequency P'≅84 lines per cm, when printed on both sides of a sheet with an interval z of 7 pixels. Printers with a higher dpi capability, e.g., of 1200 dpi, or 9600 dpi can print a correspondingly larger number of lines per inch with a smaller width W at the same ratio of Q:W.

In one embodiment, the frequency P' is greater than 30 lines/cm in order to bend the light into different spectra/colors, such as at least 50 lines/cm, or at least 80 lines/cm, or at least 120 lines/cm, or at least 160 lines/cm, or at least 320 lines/cm, such as up to 2000 lines/cm. Put another way, in various embodiments, the pitch p' of the lines 34, 40, 36, 42 may be no greater than 0.35 mm, or no greater than 0.3 mm, or no greater than 0.2 mm, or no greater than 0.15 mm, or no greater than 0.10 mm, or no greater than 0.06 mm, or no greater than 0.03 mm.

Figure 5:
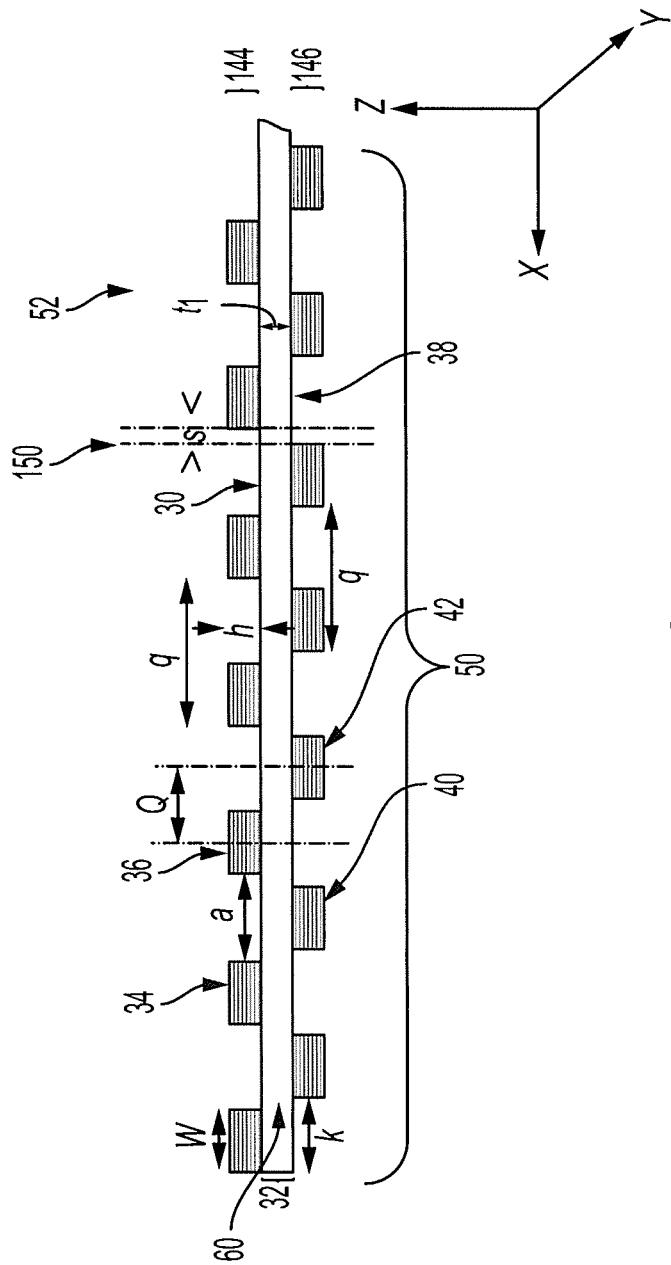
FIG. 5 is a side sectional view of one embodiment of the article of FIG. 3.

In one embodiment, the substrate 32 includes or consists of a single transparent layer 60 (e.g., a sheet or roll) of transparent media, as illustrated in side sectional view in FIG. 5. The first set 46 of parallel lines 34, 36, etc., is printed on the upper (first) surface 30 of the transparent layer 60 with a toner or other marking material. The second set 48 of parallel lines 42, 44, etc., is printed on the lower (second) surface 38 of the transparent layer 60 with a toner or other marking material. The lines 34, 36 are in the form of ridges with a height h, in the Z direction, a spacing a, and an interval q. Similarly, lines 42, 44 and are in the form of ridges with a height h, a spacing a, and an interval q. The lines 42, 44 are each offset from a nearest line 34, 36, in the X and or Y direction, by k, so that in combination, adjacent pairs of the lines 34, 42, and 36, 44 are spaced by an interval Q, where Q=q/2.

As will be appreciated, rather than being rectangles, the ridges defined by the toner lines 34, 36, 42, 44 when viewed under a microscope, appear more like rolling hills than rectangles. The grating 50 passes much of the light and acts as a transmission grating.

While in one embodiment, the edges of adjacent lines are colinear (where, k=Q=a=w), in other embodiments, spaces 150 may exist between the adjacent lines, as illustrated in FIG. 5 (where k>w, k>Q). The width s of the spacing can be used to control the amount of light that passes through the grating. The spacing s between a sequential pair of lines 34, 40 or 36, 42 may be ≥0 mm. When s=0, the spacing is closed as much as possible (assuming no dot gain issue), limiting white light transmission. To compensate for dot gain, the nominal gap a between printed pixels on each side may be at least two pixels wide so that even with a slight dot gain, there is still a space s>0 between adjacent lines. Where the size of printed pixels can be controlled so that the printed lines do not exceed the theoretical pixel width (e.g., less than the theoretical pixel width), the nominal gap a can be as little as 1 pixel and s may be less than 1 pixel.

Figure 6:
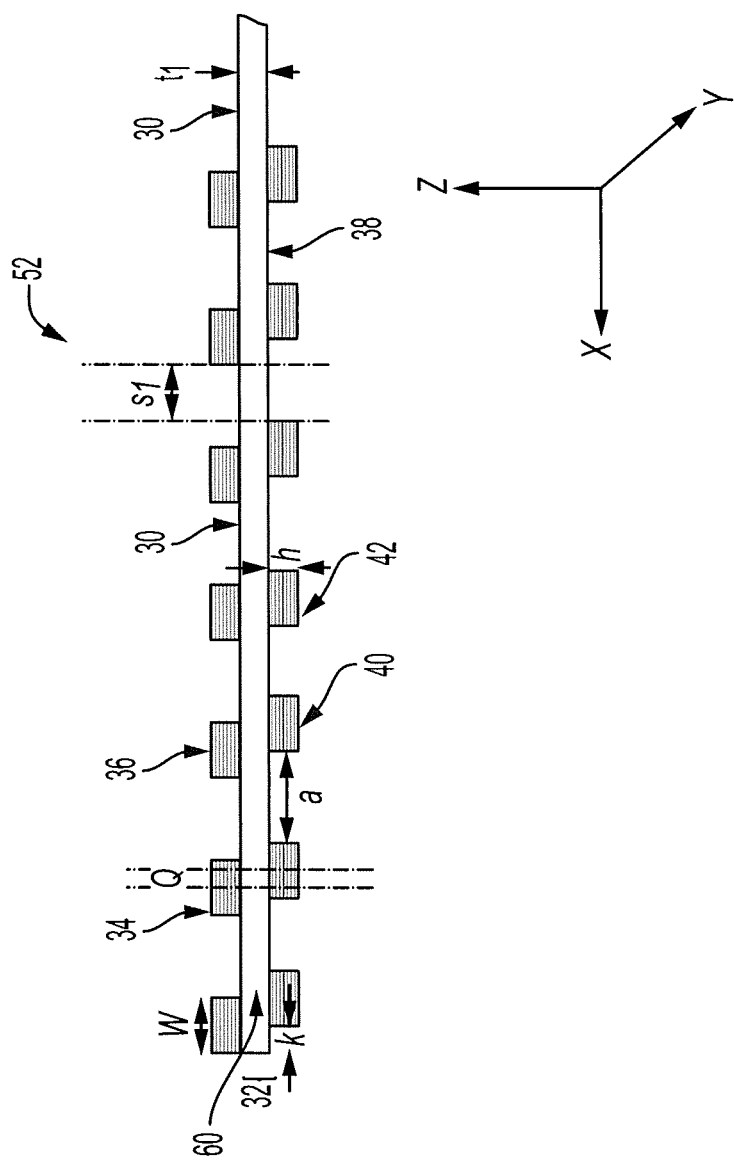
FIG. 6 is a side sectional view of another embodiment of the article of FIG. 3.

FIG. 6 is a side sectional view of another embodiment of the article of FIG. 3, in which adjacent lines 34, 40 are partially, but not completely, overlapping in the Z direction. In this embodiment, the offset k<w. A maximum spacing $s_1$ between lines is greater than 0, in this example.

In some embodiments, the diffraction grating 52 includes at least 10, or at least 20, or at least 50 lines 34, 36 on the first, e.g., upper surface of the substrate 60 and the same, or approximately the same, number of lines 40, 42 on the lower surface.

The toner (sometimes referred to as dry ink) used to form the lines may be a conventional toner suited to xerographic printing. Suitable toners generally include particles, generally composed of one or more colored pigments embedded inside polymer beads. In one embodiment, the toner is black (K) in color or is a color which generally absorbs incident light. When applied to the sheet 60, the toner particles carry a charge. For example, during printing, a negatively-charged toner is attracted to a positive latent image on a photoreceptor and the toner is then attracted to the transparent layer 60, which also positively charged (or vice versa). The same toner, or a different toner, may be used for printing each side 30, 38 of the sheet 60.

Alternatively, the lines 34, 36, 42, 44 are formed from inkjet ink, which may include a curable polymer resin to increase the height of the lines. The resin may be cured with heat, UV or other suitable radiation, combination thereof, or the like. While inkjet printers tend to be less accurate in placement of dots, they suffer less from dot gain and thus the lines may be printed closer.

Figure 7:
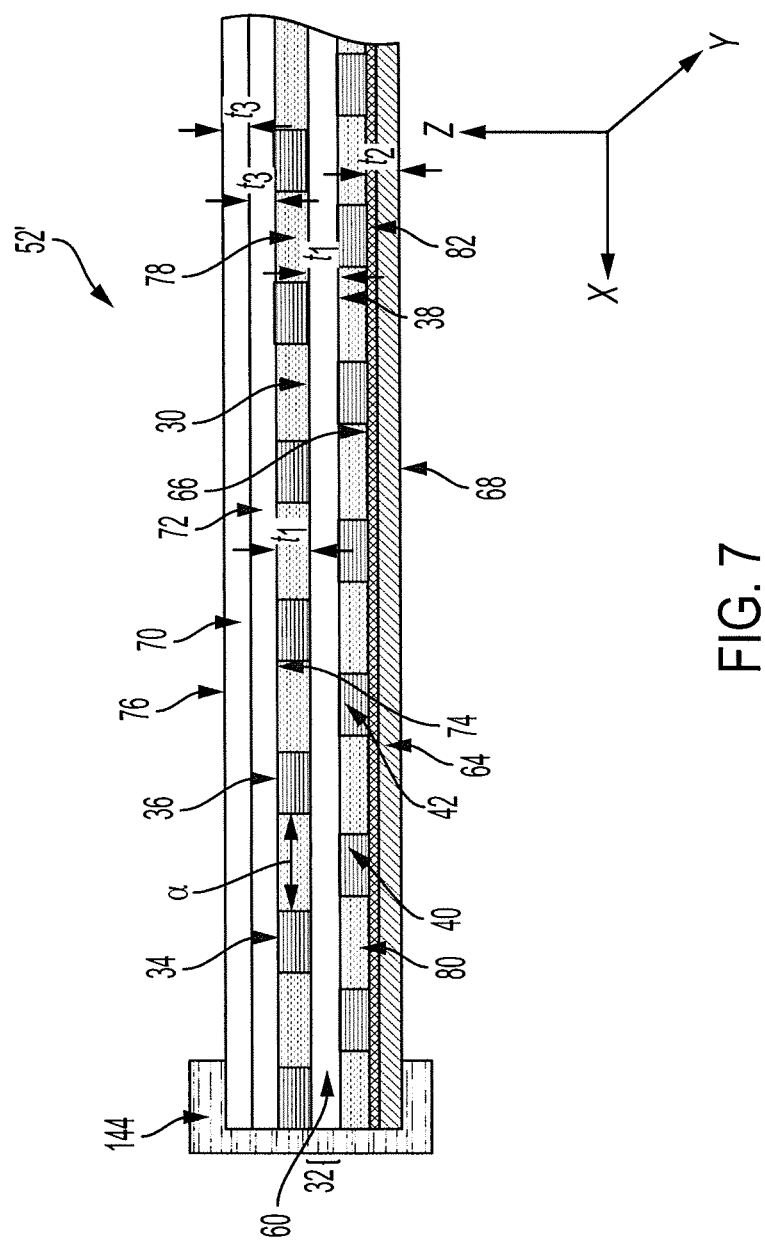
FIG. 7 is a side sectional view of yet another embodiment of the article of FIG. 3.

In one embodiment, the article includes more than one layer, as illustrated in FIG. 7. In the embodiment of FIG. 7, the printed article, denoted 52', includes or consists of a first transparent layer 60, as for FIGS. 5 and 6, and a light-reflective layer 64, having a first (upper) surface 66 and an opposed lower surface 68, which defines a lower surface of the printed article 52'. Additionally, the printed article 52' of FIG. 7 (and optionally also that of FIGS. 5 and 6) may include at least one additional transparent layer, such as one or more upper transparent layer(s) 70, 72, positioned above the layer 60 (in the Z direction), on the opposite side of the substrate 32 to the reflective layer 64. In one embodiment, layers 60 and 64 are adjacent, with the reflective layer contacting the second set of lines 40, 42, etc. Additionally, or alternatively, there may be one or more lower transparent layers (not shown), which is/are positioned intermediate the reflective layer 64 and the transparent substrate 60.

Each of the additional transparent layers 70, 72, etc. may be formed from the same material as layer 60 or from a different transparent material and may be of the same or different thickness(es). An uppermost one of the upper transparent layers 70 defines an upper surface 76 of the printed article 52'. A lowermost one of the upper transparent layers 72 may have a lower surface 74 which is in contact with the upper set of printed lines 34, 36, etc. The layer 72 may extend (at least partially) into gaps 78 defined between the printed lines 34, 36 or the gaps 78 may be filled with air or with a separate transparent toner material (or polymer resin suitable for inkjet printing). Similarly, gaps 80 between the lower lines 40, 42 may be filled with air or with a transparent toner material (or polymer resin suitable for inkjet printing). While two upper transparent layers 70, 72 are shown, it is to be appreciated that there may be zero, one, two, or at least three, or at least four upper and/or lower transparent layers, such as up to ten.

In one embodiment, rather than using multiple top layers 70, 72, a single layer may be employed with a thickness greater than $t_1$.

In one embodiment, the light-reflective layer 64 is formed of a flexible material, such as a glossy paper or card. The paper or card may be formed from fibers derived primarily from wood, cotton, hemp, or combination thereof. A coating 82 on the paper may be formed from inorganic materials and/or an organic polymer, such as polyethylene. Example inorganic materials include clay (kaolin), chalk (calcium carbonate), bentonite, and talc, and mixtures thereof. The chalk or china clay may be bound to the paper or card with synthetic viscosifiers, such as styrene-butadiene latexes and/or natural organic binders, such as starch. The coating formulation used to form the coating 82 may also contain dispersants, resins, and other additives.

The light-reflective layer 64 has a thickness $t_2$ which may be less than the thickness $t_1$ of the transparent layer 60, depending on the type of glossy paper or card used. $t_2$ may be, for example, at least 0.07 mm and in some cases, up to 0.1 mm, or up to 0.2 mm, or higher in the case of card stock. In some embodiments, the reflective layer 64 may be printed, e.g., using one or more marking materials, such as ink(s) or toner(s).

The reflective layer 64 reflects light in the visible range of the spectrum (about 400 to 700 nm). Reflection can be measured in terms of specular gloss according to TAPPI Test Method T 653 om-07: Specular gloss of paper and paperboard at 20 degrees (70° from the plane of the paper), and may be at least 60, or at least 70.

The printed article 52' of FIG. 7 can serve as a partial mirror.

In another embodiment, one or more of the transparent layer(s) 70, 72 may be omitted, and optionally added later.

In the embodiment of FIG. 7, the transparent layer(s) 60, 72, 70 may consist of or comprise transparent sheets that are stacked one on top of the other. The transparent layer(s) 60, 72, 70 transmit light in the visible range of the spectrum, e.g., have a transmission of at least 80% of the visible light which is incident normal (90°) to one surface. As will be appreciated, the layer 60 becomes semi-transparent (i.e., lower transmittance) when printed with the lines 34, 36, 40, 42, etc.

Examples of polymeric materials suitable for use as layers 60, 72, and/or 70 include polyvinyl alcohol (PVOH); polystyrene (PS) and styrene copolymers, such as acrylonitrile-butadiene-styrene (ABS); polyvinylidene fluoride; polyvinyl acetals, such as polyvinyl butyral; unsaturated and saturated polycarbonates; polyvinylpyrrolidone (PVP); polyoxymethylene (also known as acetal, polyacetal, and polyformaldehyde); vinyl imidazole copolymers, such as 1-vinylimidazole; polyamides, such as aliphatic polyamides, polyphthalamides, and aramids; polyethers and polyesters, e.g., polyethylene terephthalate (PET), polybutylene terephthalate, poly(lactic acid) (PLA); cyclic olefin copolymers (COC), such as ethylene-norbornene copolymer; polyaryletherketones, such as polyetheretherketone (PEEK); polyetherimides (PEI) (e.g., ULTEM); polyimides (PI); polyolefins, such as polypropylene (PP) and polyethylene (PE); polyacrylates and methacrylates, such as poly(methyl methacrylate) (PMMA), poly(vinyl chloride) (PVC); polyacrylonitrile (PAN); and copolymers and mixtures thereof. The layers 60, 72, 70 may be formed from the same or different materials.

In one embodiment, the transparent layer(s) 60, 72, 70 may be a standard transparency media, such as polyester (polyethylene terephthalate), cellulose acetate, acrylic, or the like, and may be coated with a thin coating to improve printability.

A suitable thickness of the layers 60, 70, 72 depends, in part, on the type of polymer, which affects the refractive index, strength, and flexibility of the layer. Sheets of polymeric material 60 should be sufficiently flexible yet strong enough to pass through a xerographic printer without breaking or causing jams. Additionally, if upper and/or lower layers 70, 72, etc., are to pass through the printer, they should also have suitable flexibility and strength properties. The thickness of the layers 60, 70, 72 may be, for example, at least 0.02 mm (20 µm), or at least 0.04 mm and/or up to 1.0 mm, or up to 0.5 mm, or up to 0.3 mm, or up to 0.2 mm, or up to 0.175 mm, or up to 0.15 mm. Where only a single upper layer 70 is used, it may have a thickness of at least 0.1 mm and/or up to 0.5 mm, or greater.

In some embodiments, the layers 60, 70, 72 may all have the same thickness. In some embodiments, the upper layer or layers 70, 72 may each have a thickness $t_3$ which is greater than the thickness $t_1$ of the substrate layer 60. For example, $t_3$ may be greater than 0.3 mm in some cases, such as at least 0.4 mm or at least 0.5 mm.

Figure 8:
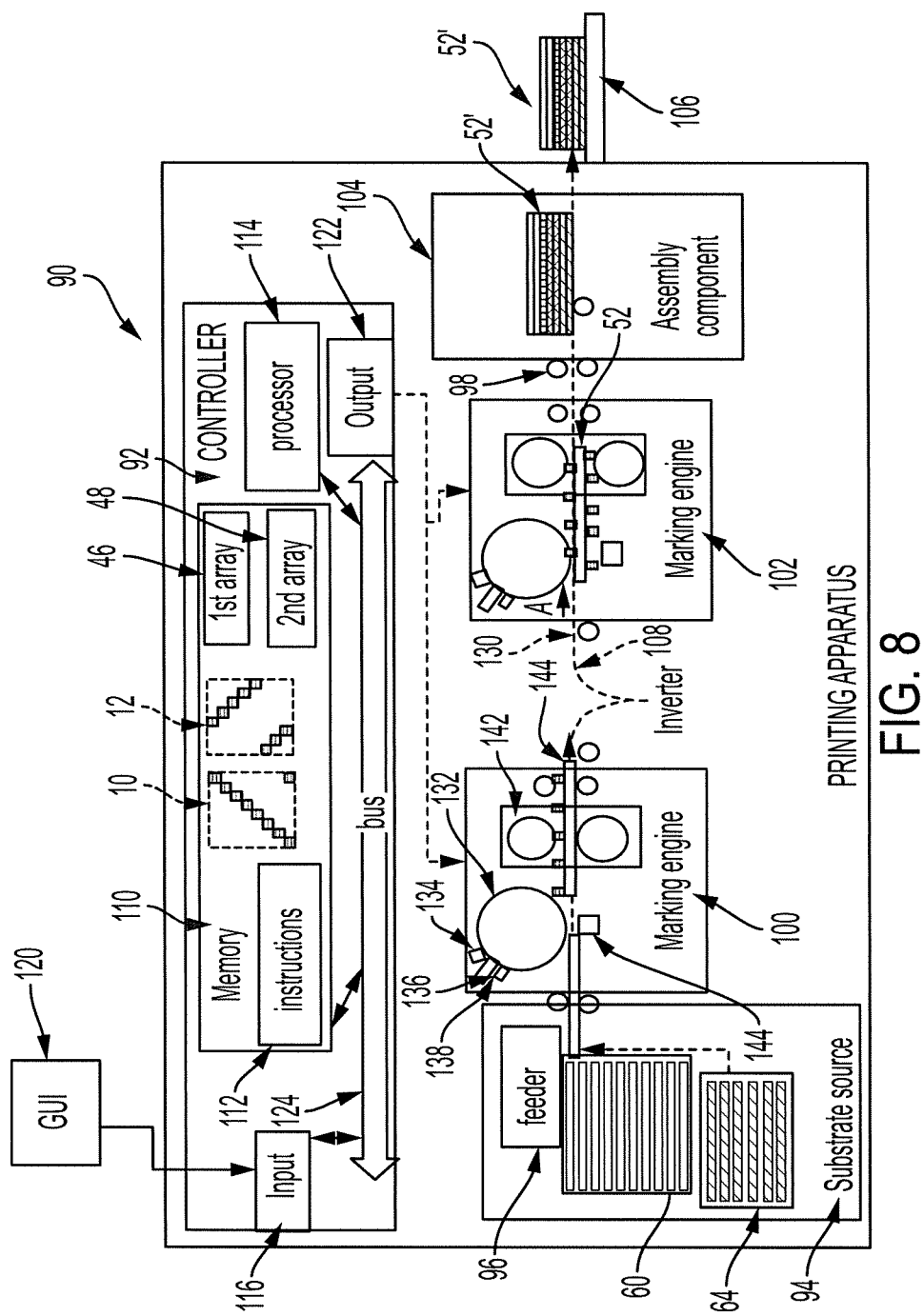
FIG. 8 is a functional block diagram of an apparatus for forming an article comprising a diffraction grating in accordance with one aspect of the exemplary embodiment.

FIG. 8 illustrates a printing apparatus 90 for forming the printed article 52, 52' of FIG. 5, 6, or 7. The apparatus includes a controller 92, a substrate source 94, a sheet feeder 96, a transport mechanism 98, at least one xerographic (electrophotographic) marking engine 100, 102, optionally, an assembly component 104, and an output device 106, such as a tray. The term "printer" or "printing apparatus," as used herein, encompass any apparatus, such as a digital copier, bookmaking machine, facsimile machine, multi-function machine, etc., which performs a print outputting function for any purpose. In one embodiment, the printer includes two marking engines 100, 102, arranged for duplex printing. An inverter 108, positioned between the two marking engines, inverts sheets printed by the first marking engine, so they can be printed, on the second side, by the second marking engine 102. In another embodiment, an inversion path (not shown) returns the recto-printed sheets to the first (only) marking engine 100 for printing the verso side.

The controller 92 includes memory 110, which stores the digital patterns 10 and 12 from which a diffraction grating 50 can be generated by printing multiple instances of each pattern on a respective side 30, 38 of the substrate 60. The memory 110 further includes software instructions 112 for rendering the diffraction grating 50 on the transparent sheet 60. A processor 114, in communication with the memory, executes the instructions. The controller may include an input device 116 for receiving the patterns 10, 12, and/or information for generating the patterns, from a user, e.g., via a graphical user interface (GUI) 120. The received information may include one or more of the width w, interval z and angle α, β. The controller includes an output device 122 for sending instructions to the marking engine(s) 100, 102 for rendering the diffraction grating 50 on the transparent layer 60. Hardware components 110, 114, 116, 122 of the controller may be communicatively connected by a data/control bus 124. As will be appreciated, the controller, or parts thereof, may be remote from the rest of the printing apparatus 90, e.g., on a remote server that is communicatively connected with the other parts of the printing apparatus by wired or wireless links.

The memory 110 may represent any type of non-transitory computer readable medium such as random access memory (RAM), read only memory (ROM), magnetic disk or tape, optical disk, flash memory, or holographic memory. In one embodiment, the memory 110 comprises a combination of random access memory and read only memory.

The digital processor device 114 can be variously embodied, such as by a single core processor, a dual core processor (or more generally by a multiple core processor), a digital processor and cooperating math coprocessor, a digital controller, or the like. The digital processor 114, in addition to executing instructions 112 may also control the operation of the printer.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or the like, and is also intended to encompass so called "firmware" that is software stored on a ROM or the like. Such software may be organized in various ways, and may include software components organized as libraries, Internet based programs stored on a remote server or so forth, source code, interpretive code, object code, directly executable code, and so forth. It is contemplated that the software may invoke system level code or calls to other software residing on a server or other location to perform certain functions.

The substrate source 94 holds a supply of transparent sheets to serve as the transparent layer(s) 60, 70, 72, etc. (and/or reflective layer 64) and may include one or more trays. In some embodiments, a first of the trays holds transparent sheets 60 and a second of the trays holds reflective sheets 64. The feeder 96 supplies the transparent sheets 60 to the transport system 98, which may be composed of rollers, belts, or the like. The transport system 98 conveys the transparent sheets 60, in the direction of arrow A, along a print media path 130 to the first xerographic marking engine 100, where the first set of lines 34, 36 is printed on the print media 60 using toner particles to form a first semi-transparent diffraction grating layer. The printed article is conveyed, by the transport mechanism 98, from the first marking engine 100, via the inverter 108, to the second xerographic marking engine 102, where the second set of lines 40, 42 is printed on the print media 60 using toner particles to form a second semi-transparent diffraction grating layer. The printed assembly 52 is conveyed from the second marking engine 102 to the assembly component 104 and/or output device 106.

The exemplary marking engines 100, 102 may both be monochrome (single color) marking devices, employing a single toner type, such as black toner. However, color marking engine(s) may alternatively be used. The marking engine 100 may include suitable hardware elements employed in the creation of desired images by electrophotographic processes. In one embodiment, each marking engine includes a charge retentive surface, such as a rotating photoreceptor 132 in the form of a belt or drum. The lines 34, 36, etc., are created on a surface of the photoreceptor. Disposed at various points around the circumference of the photoreceptor 100 are xerographic subsystems which may include a charging station 134, such as a charging corotron, for each of the toner colors to be applied (one in the case of a monochrome printer, four in the case of a CMYK printer), an exposure station 136, which forms a latent image on the photoreceptor (e.g., with a laser or LED light source) corresponding to the lines 34, 36, a developer unit 138, associated with each charging station for developing the latent image formed on the surface of the photoreceptor by applying a toner to obtain a toner image. A transferring unit 140, such as a transfer corotron and/or an intermediate transfer belt, transfers the toner image (diffraction grating) thus formed to the surface of the transparent sheet 60 as it passes by the photoreceptor. Optionally, a fuser 142 fuses the diffraction grating image 50 to the sheet. The fuser generally applies at least one of heat and pressure to the sheet 60 to physically attach the toner to the sheet. The marking engine 102 is similarly configured to marking engine 100 to apply lines 40, 42, etc.

In other embodiments, each marking engine 100, 102 is an inkjet marking engine which employs liquid ink(s) rather than dry toner.

The assembly component 104 may be used to form the printed article 52' from the printed article 52 output by the marking engine 102. In one embodiment, the assembly component 104 assembles the layers 64, 60, 72, 70 in sequence and joins them together, e.g., with one or more of heat, an adhesive, binding, clamps, and stapling. The assembled layers only need to be joined around a perimeter, outside the area to be used as the diffraction grating 50. Thus, one or more of the four sides can be stapled, glued, bound into a spine of a book, etc., as illustrated in FIG. 7 at 144. The printed article 52' is output. In other embodiments, the assembly component 104 may be a separate device/omitted.

Figure 9:
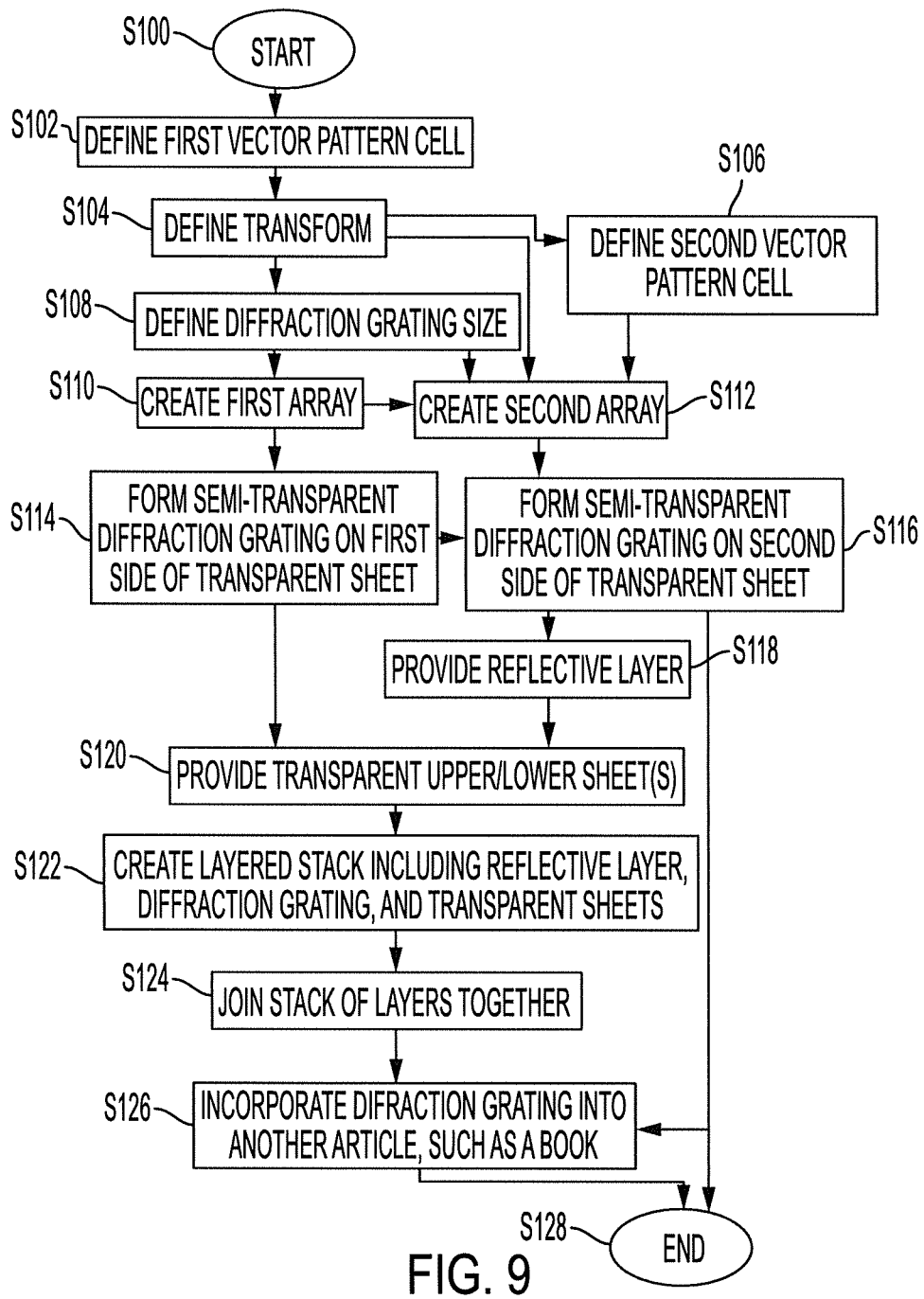
FIG. 9 is a flow chart illustrating a method of forming an article comprising a diffraction grating in accordance with one aspect of the exemplary embodiment.
Figure 10:
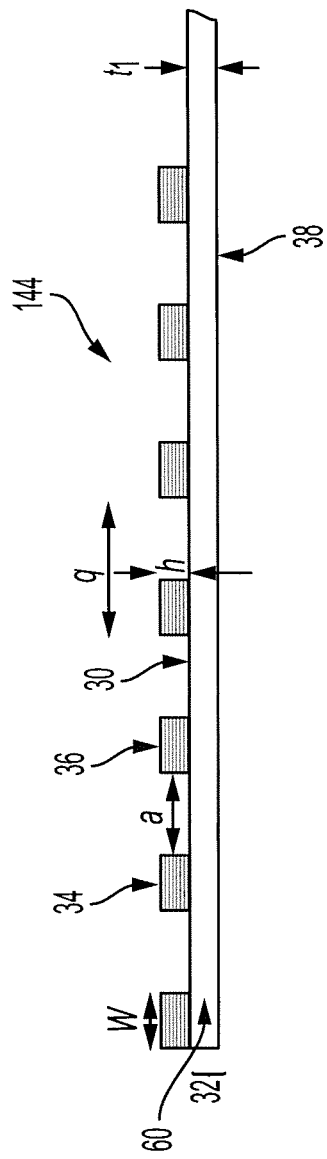
FIG. 10 is a side sectional view of a transparent substrate with lines printed on a first side.

FIG. 9 illustrates a method of printing a diffraction grating in accordance with the exemplary embodiment, which may be performed with the apparatus of FIG. 8. The method begins at S100.

At S102, a first vector pattern cell 10 is defined (e.g., as illustrated in FIG. 1). This step includes defining a frequency $1/q$ (or $1/p$), angle α, and width w (in pixels) of the vector. The vector pattern cell 10 is stored in memory, such as printer memory 110.

At S104, a transform T, such as a correction matrix or affine transform, is defined to account for front to back registration. The front to back transform may account for position, scaling, rotation and shear. In particular, the transform T may account for the inversion of the first side array of lines when the substrate 60 is inverted. A desired overlap correction s is optionally applied for controlling the amount of light that passes through the grating. Each individual pixel may print larger than the electronic pixel due to dot gain. Accordingly, this may be taken into consideration in defining the vector pattern cells. The definition of the transform T may include passing a registration transparency through the printer, printing the parallel lines on front and back sides and measuring the extent to which the lines are not equally spaced (the spacing s should ideally be the same between each pair of printed lines 34, 40 and 40, 36, etc.) and in general, s>0.

Methods for computing a transformation are described, for example, in above-mentioned U.S. Pub. No. 20100046033.

In one embodiment, at S106, a second vector pattern cell 12 is defined (e.g., as illustrated in FIG. 2). This step includes defining an angle β of the vector. The frequency 1/q (or 1/p) and width w of the vector may be the same as for pattern 10. The vector pattern cell 12 may be generated by applying the transformation T to the vector pattern cell 10, to account for front to back registration and desired alignment. The vector pattern cell 12 is stored in memory, such as printer memory 110.

At S108, a diffraction grating size is defined (e.g., by a user via the GUI 120), which is used to determine the number of cells 10 (and correspondingly cells 12) to be composed into an array.

At S110, a first array 46 is generated by combining multiple instances of vector pattern cell 10. In another embodiment, rather than defining the vector pattern cell 10 and forming an array from multiple instances, a respective single X×Y array may be defined for the first side of the layer 60.

At S112, a second array 48 is generated. In one embodiment, array 48 is generated by combining multiple instances of vector pattern cell 12 generated at S106. Alternatively, the second array 48 is generated by applying the transform T, such as a correction matrix or affine transform, to the first array 46.

At S114, a semi-transparent partial diffraction grating 144 (FIG. 9) is formed by printing lines 34, 36, etc., corresponding to the array 46 of vector pattern cells 10, onto a first side 30 of a transparent sheet 60, using the xerographic marking engine 100, to form a pattern of equally-spaced ridges having a length l which is substantially greater than the height h. While this type of printing is often considered 2-dimensional (2D), there is a 3D aspect due to the toner height h.

At S116, a semi-transparent diffraction grating 50 (FIG. 5) is formed by printing lines 40, 42 corresponding to the array 48 of vector pattern cells 12 onto the partial diffraction grating 144, i.e., on the second side 38 of the transparent sheet 60, using the xerographic marking engine 102, to form a pattern of equally-spaced ridges having a length l which is substantially greater than the height h. A first edge of each line 40, 42, etc. is offset from the first edge of the nearest line 34, 36, etc. on the upper surface by an offset k, such that midpoints of pairs of lines 34, 40 lines are equally spaced. For example, k<q, k≥Q and/or k≥w.

At S118, for forming a mirror as in FIG. 7, a reflective layer 64 may be provided, such as a sheet of coated white paper or card, which may be printed with an image. In some embodiments, the reflective layer 64 may be passed through the printing apparatus, e.g., without printing, using feeder 96 and transport mechanism 98. In other embodiments, a stack of reflective layers 64 is provided downstream of the marking engine(s) 100, 102.

At S120, one or more transparent sheets for layering over the diffraction grating may be provided. For example, one, two, three, or more fully-transparent sheets 70, 72, may be passed through the printer from the substrate source 94, without printing or with only limited printing in an area outside the region serving as the diffraction grating 50. In other embodiments, a stack of transparent sheets is provided downstream of the marking engine 102.

At S122, a layered stack of medias is created, e.g., by stacking the layers from back to front. The first (optional) layer is the reflective layer 64. The second layer is the printed semi-transparent diffraction grating layer 52. The third and subsequent layers (optional) are fully-transparent sheets 70, 72, etc.

At S124 the layers 64, 60, 72, 70 in the stack are joined together (FIG. 7), e.g., by binding, stapling, adhesive, and/or heat, or a subset of the layers is assembled, for inclusion of additional layers later. The resulting mirror 52' can be used as a standalone mirror or formed into another article. For example, it may be used as a page of a book (S126). This step may be incorporated into step S124.

The method ends at S128.

As will be appreciated, steps S118, S120, S122, and S124 may be omitted to form a transmission grating article 52 rather than a reflective grating article 52'. The transmission grating article 52 may be formed into another article. For example, it may be used as a page of a book (S126).

The method illustrated in FIG. 9 may be implemented, in part, in a computer program product that may be executed by the controller 92. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the controller 92 (for example, an internal hard drive of RAM), or may be separate (for example, an external hard drive operatively connected with the printer), or may be separate and accessed via a digital data network such as a local area network (LAN) or the Internet (for example, as a redundant array of inexpensive or independent disks (RAID) or other network server storage that is indirectly accessed by the controller, via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

As will be appreciated, the steps of the method need not all proceed in the order illustrated and fewer, more, or different steps may be performed.

Figure 11:
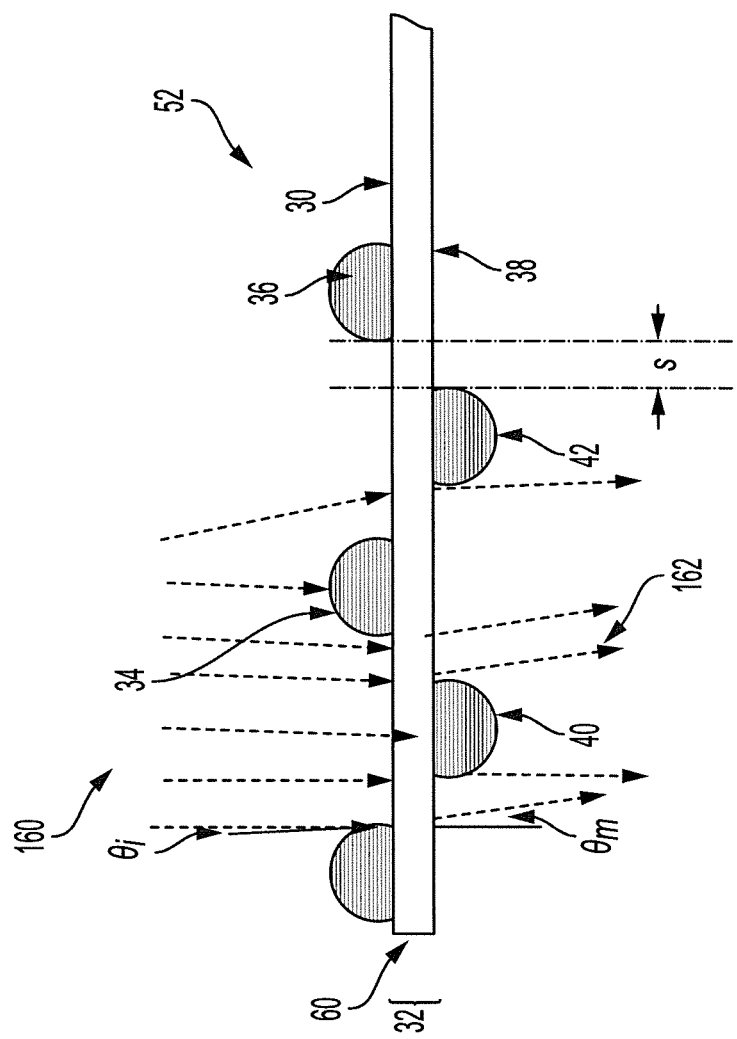
FIG. 11 illustrates light transmission by the article of FIG. 5.

In use, the incident light may be natural or "white" light, having a range of wavelengths in the visible range of the spectrum, or may be monochromatic light. The transmissive diffraction grating article 52 (and similarly reflective diffraction grating article 52') causes the incident light to be diffracted into several beams travelling in different directions. As is known in the art, diffraction gratings, either transmissive or reflective, can separate different wavelengths of light using a repetitive structure, here a sequence of parallel lines 34, 36, 40, 42, which have a similar height and shape that extend above and below the layer 60. The structure of the grating affects the amplitude and/or phase of the incident wave 160, causing interference in the output wave 162 (FIG. 11). In the transmissive case, the repetitive structure can be thought of as many tightly spaced, openings, where light can scatter. Solving for the irradiance as a function wavelength and position of the openings, an expression for transmission diffractive gratings when the angle of incidence, relative to normal to the surface, of light on the upper side 30 is $\theta_i$, the spacing is s and the wavelength is $\lambda$ can be defined as in the following simplified grating equation:

$$s[\sin(\theta_m) - \sin(\theta_i)] = m\lambda \quad (1)$$

where m is the order of principal maxima, such as 0 or 1, and $\theta_m$ is the angle, relative to normal to the lower surface 38, of light exiting the grating. $\theta_i$ and $\theta_m$ are both positive if on the same side of the surface normal, otherwise $\theta_m$ is negative. For a given order m, different wavelengths of light will exit the grating at different angles. For white light sources, this corresponds to a continuous, angle-dependent spectrum.

As an example, when illuminated with a beam 160 of light, the transmission grating 52 splits the beam into two (or more) beams with different angles, as illustrated in FIG. 11. Light striking the toner lines 34, 36, 40, 42, tends to be substantially absorbed rather than transmitted or reflected, particularly when the toner is black in color.

In the case of a reflective grating article 52', where incident 160 and reflected light 162 are on the same side 30 of the grating (see FIG. 12), a simplified grating equation can be defined as follows:

$$s[\sin(\theta_m) + \sin(\theta_i)] = m\lambda \quad (2)$$

where $\theta_i$ is positive and $\theta_m$ is negative if the incident and diffracted light are on opposite sides of the surface normal, otherwise both are positive.

For further details on the theory of diffraction gratings, see, for example Thorlabs Grating Tutorial, available at https://www.thorlabs.com/tutorials.

Figure 12:
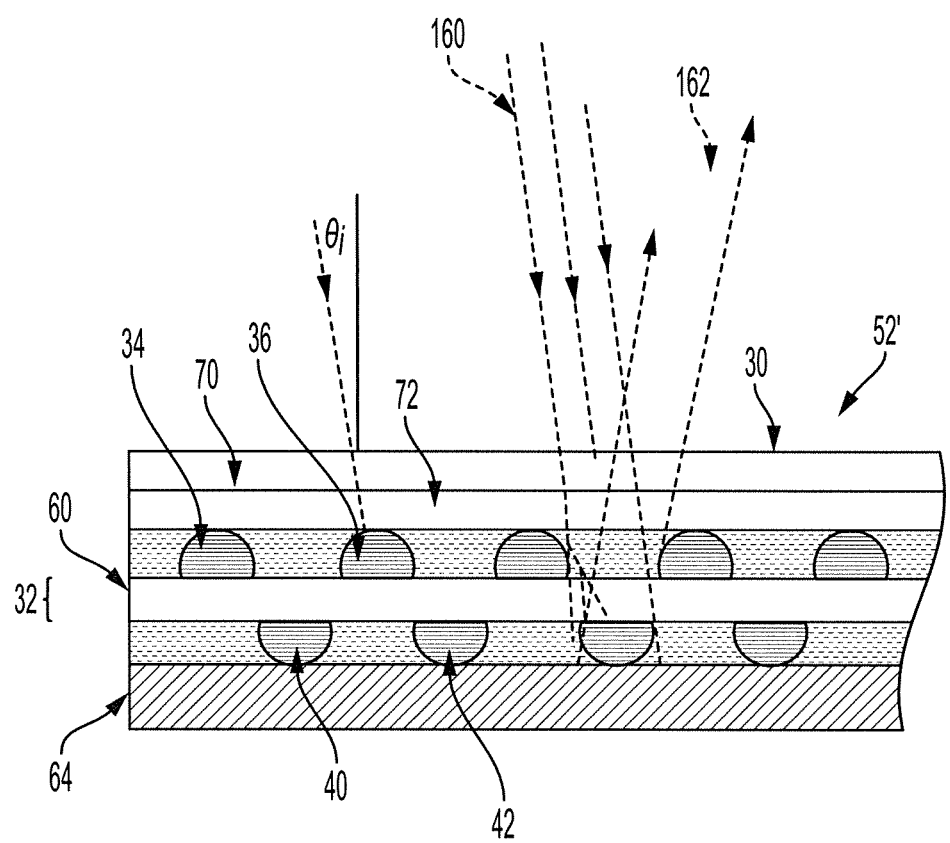
FIG. 12 illustrates light reflection by the article of FIG. 7.

As an example, when illuminated with a beam 160 of light, the reflective grating 52' reflects the beam as two (or more) beams with different angles, as illustrated in FIG. 12.

EXAMPLE

A partial mirror is created by printing a diffraction grating at 75 lines per inch on both sides of a transparent plastic transparency material. The transparency material is placed on top of a sheet of glossy paper. Three sheets of the same transparency material are placed on top of the printed diffraction grating and the assembly bound together. The resulting mirror is sufficiently reflective for a user to see features of his face. Color rendering and visibility are improved as compared with a similar partial mirror created by printing a diffraction grating at 75 lines per inch on only one side of a transparent plastic transparency material with three sheets of the same transparency material placed on top.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method of forming an article comprising a diffraction grating comprising:

providing a transparent substrate having a thickness of at least 0.02 mm;

forming a periodic structure by printing a first set of parallel lines on a first side of the transparent substrate with a marking material and printing a second set of parallel lines on a second side of the transparent substrate with a marking material, alternating ones of the parallel lines on the first and second sides, in combination, defining a grating having a frequency and a spacing between lines which causes incident light to be diffracted into a plurality of beams travelling in different directions.

2. The method of claim 1, wherein the transparent substrate comprises a flexible polymer sheet.

3. The method of claim 2, wherein the flexible polymer sheet has a thickness of no greater than 0.5 mm.

4. The method of claim 1, wherein the printing comprises xerographic printing and the marking material comprises a toner.

5. The method of claim 1, wherein the parallel lines forming the grating have a pitch of no greater than 0.3 mm.

6. The method of claim 1, wherein the parallel lines forming the grating have a pitch of no greater than 0.2 mm.

7. The method of claim 1, further comprising storing a first vector pattern cell in memory, generating a first array comprising multiple instances of the first vector pattern cell in memory and printing the first set of parallel lines in accordance with the array.

8. The method of claim 7, further comprising applying a correction matrix or affine transform to the first vector pattern cell to generate a second vector pattern cell, generating a second array comprising multiple instances of the second vector pattern cell in memory, and printing the second set of parallel lines in accordance with the second array.

9. The method of claim 7, further comprising applying a correction matrix or affine transform to the first array to generate a second array and printing the second set of lines in accordance with the second array.

10. The method of claim 7, wherein the first vector pattern cell includes on pixels and off pixels, portions of at least two parallel lines being defined by the on pixels, each portion of one of the at least two parallel lines being spaced from the portion of the next line by at least two of the off pixels.

11. The method of claim 1, further comprising at least one of:

covering at least one of the first and second sides of the printed transparent substrate with at least one transparent layer; and supporting the printed transparent substrate on a reflective layer.

12. The method of claim 11, wherein the at least one transparent layer comprises a sheet of transparent material.

13. The method of claim 11, wherein the reflective layer comprises a glossy paper or card.

14. The method of claim 11, wherein the at least one transparent layer comprises a plurality of transparent layers.

15. The method of claim 11, further comprising:

passing a sheet of glossy paper or card through a printer to serve as the reflective layer;

thereafter, passing a transparent substrate through the printer which prints the lines on the transparent substrate;

thereafter, passing at least one transparent sheet through the printer to serve as the transparent layer; and forming a stack from the sheet of glossy paper or card, printed transparent substrate, and the at least one transparent sheet.

16. The method of claim 1, wherein the article is a book which incorporates the diffraction grating.

17. The method of claim 1 wherein the diffraction grating is a transmissive diffraction grating.

18. The method of claim 1 wherein the diffraction grating is a reflective diffraction grating.

19. An article formed by the method of claim 1.

20. An article formed by the method of claim 1, comprising:
- a transparent substrate;
- a diffraction grating forming a periodic structure, the diffraction grating including a first set of parallel lines of marking material on a first side of the transparent substrate and a second set of parallel lines of marking material on a second side of the transparent substrate, the diffraction grating having a frequency and a spacing between lines which causes incident light to be diffracted into a plurality of beams travelling in different directions.

21. A printing apparatus for performing the method of claim 1, comprising:
- memory which stores:
  - a first vector pattern cell;
  - instructions for combining multiple instances of the first vector pattern cell to form a first array of parallel lines; and
  - instructions for:
    - applying a correction matrix or affine transform to the first array of parallel lines to generate a second array of parallel lines, or
    - applying a correction matrix or affine transform to the first vector pattern cell to generate a second vector pattern cell and for combining multiple instances of the second vector pattern cell to form a second array of parallel lines;
- a source of a transparent substrate;
- a first marking engine which prints the first array of parallel lines onto a first side of the transparent substrate;
- the first marking engine or a second marking engine printing the second array of parallel lines onto a second side of the transparent substrate; and
- optionally, an assembly component which assembles a stack comprising a sheet of glossy paper or card, the printed transparent substrate, and optionally at least one transparent layer and optionally joins the stack together, to form the article.

22. A method of forming an article comprising a diffraction grating comprising:
- storing a first vector pattern cell in memory;
- generating a first array comprising multiple instances of the first vector pattern cell in memory;
- generating a second array comprising one of:
  - applying a correction matrix or affine transform to the first vector pattern cell to generate a second vector pattern cell and generating the second array comprising multiple instances of the second vector pattern cell in memory, and
  - applying a correction matrix or affine transform to the first array to generate the second array;
- forming a periodic structure by printing a first set of parallel lines on a first side of a transparent substrate with a marking material in accordance with the first array; and
- printing a second set of parallel lines on a second side of the transparent substrate with a marking material, in accordance with the second array, the first and second sets of lines, in combination, defining a grating having a frequency and a spacing between lines which causes incident light to be diffracted into a plurality of beams travelling in different directions.

* * * * *